C. L. DRIEFER.
SPRING WHEEL.
APPLICATION FILED JULY 13, 1908.

929,570.

Patented July 27, 1909.

Witnesses
Elinor J. Behm
O. C. Knipe

Inventor
Conrad L. Driefer
by
Medina & Griffin
Attorneys

UNITED STATES PATENT OFFICE.

CONRAD L. DRIEFER, OF SAN FRANCISCO, CALIFORNIA.

SPRING-WHEEL.

No. 929,570.

Specification of Letters Patent.

Patented July 27, 1909.

Application filed July 13, 1908. Serial No. 443,186.

*To all whom it may concern:*

Be it known that I, CONRAD L. DRIEFER, a citizen of the United States, residing at San Francisco, in the county of San Francisco and State of California, have invented a new and useful Spring-Wheel, of which the following is a specification in such full and clear terms as will enable those skilled in the art to construct and use the same.
This invention relates to a wheel used for the purpose of relieving the shock of rough roads in vehicles. Its object is to give the same resiliency to wheels as is given with a pneumatic tire, without the great expense for rubber, since with this wheel only a thin strip of solid rubber is used in the place of the large amount of rubber in a pneumatic tire.

Figure 1:
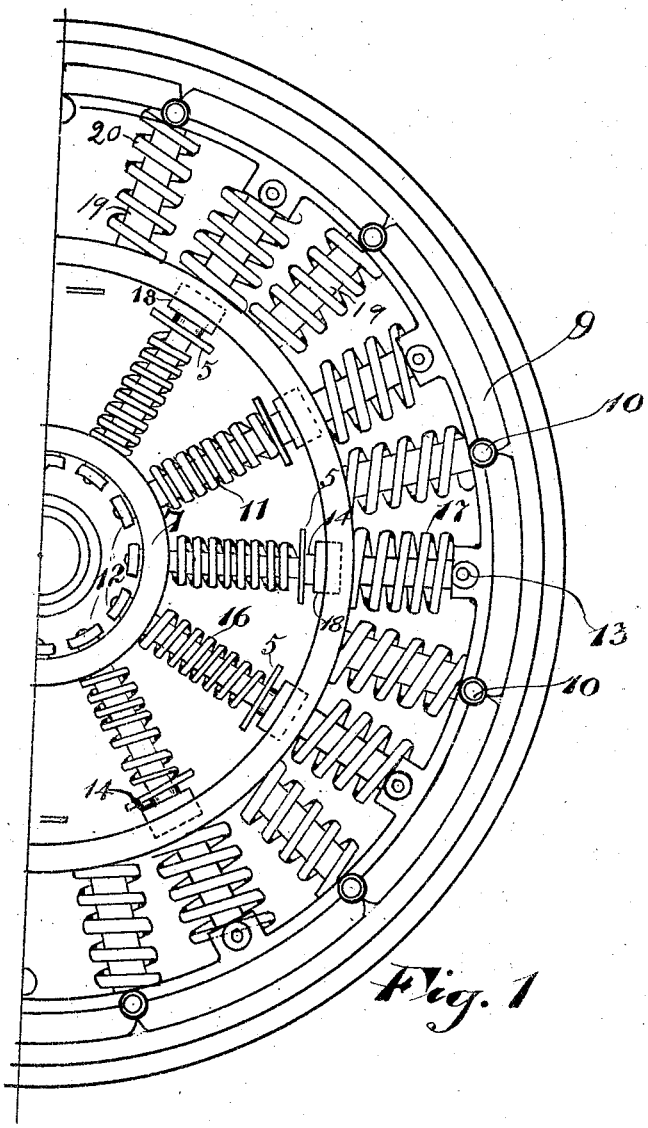
Figure 2:
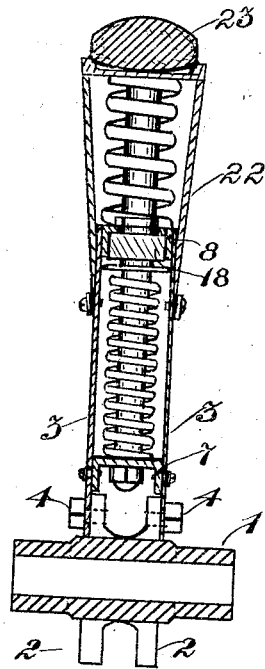

In the drawings in which the same numeral of reference is applied to the same member throughout, Figure 1 is a side view of a portion of one of the wheels the side plates of the wheel being omitted and Fig. 2 is an elevation in section of the wheel on one side of the hub.

The numeral 1 represents the hub to which are secured the flanges 2, and secured to each flange 2 is a disk 3, bolts 4 passing through the disk and into the flanges to hold the former in place. The two disks are secured together by means of two ring channels or annuli 7 and 8, the flanges of the channels or annuli extending toward the center of the wheel.
The felly 9 consists of a series of links which are secured together by means of the pins 10.

The spokes of the wheel consist of the rods 11 which have the nuts 12 at their inner ends and the pins 13 at their outer ends to secure the rods to the links of the felly, the outer ends of the rods being larger than the inner ends and forming a shoulder at 14, at which point there is a heavy washer 5 slipped over the inner and smaller rod. On the spokes are also slipped over the small inner spring 16, the large outer spring 17 and the rubber bumper 18, the purpose of the latter being to prevent the wheel from making a noise. Where one link of the felly joins another there is a rod 19 which passes through the outer channel iron 8 and is secured to the felly at its outer end, this rod having the spring 20 slipped over it to assist the other springs in giving stability to the wheels. The springs are adjusted to such a strength as will give no motion under any desired load, as for example suppose each wheel to carry a load of one ton, then the springs will be heavy enough to each sustain more than one ton, say a ton and a quarter without moving when the wagon is at rest, then when the wagon is in motion the wheels will have considerable resiliency for the reason that the blow struck by a moving wheel is much heavier than the mere weight of the wheel. Thus it will be possible to give the wheels any desired amount of resiliency, by simply using a heavy or light spring in the construction.

An advantage of this wheel is that all the moving parts are covered up, the disks 3 covering the inner springs and the sheet 22 covering the outer springs, said sheet being of heavy rubber in order that it may withstand the distortion due to motion of the links of the felly. A shallow solid rubber tire 23 is used to give the wheel a good grip on the road and to decrease the noise due to travel on stone pavements.

Having thus described my invention what I claim as new and desire to secure by Letters Patent of the United States is as follows:

1. In a wheel, the combination of a pair of plates, a hub to which said plates are secured, two channel iron annuli secured to the plates, a felly formed of a series of links, a spoke secured at one end near the center of each link, a spring surrounding the spoke and bearing on the inner side of the link and on the outer annulus, a second spring surrounding the spoke and bearing on a washer on the spoke and on the inner annulus, and means at the junction of each spoke to give the links of the tire greater resiliency.

2. In a wheel, a hub, a pair of plates secured to the hub, two annuli secured to the plates one smaller than the other, a felly formed of a series of links, a series of spokes secured on one end to the center of each link and passing through each annulus, a spring surrounding the spoke and bearing on the inner side of the felly and on the outer annulus, a second spring surrounding the spoke and bearing on a shoulder of the spoke and on the inner annulus, a short rod secured to the felly at the junction of its links, a spring surrounding the rod and bearing on the two adjacent links and on the outer annulus, said short rod extending only as far as the outer annulus.

In testimony whereof I have set my hand this 27th day of June A. D. 1908, in the presence of the two subscribed witnesses.

CONRAD L. DRIEFER.

Witnesses:
W. T. HESS,
C. P. GRIFFIN.